(12) United States Patent
Sanders et al.

(10) Patent No.: US 9,295,116 B2
(45) Date of Patent: Mar. 22, 2016

(54) SWITCHED-CAPACITOR ISOLATED LED DRIVER

(71) Applicant: THE REGENTS OF THE UNIVERSITY OF CALIFORNIA, Oakland, CA (US)

(72) Inventors: Seth R. Sanders, Berkeley, CA (US); Mitchell Kline, Oakland, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

(21) Appl. No.: 14/293,107

(22) Filed: Jun. 2, 2014

(65) Prior Publication Data
US 2014/0346962 A1 Nov. 27, 2014

Related U.S. Application Data

(63) Continuation of application No. PCT/US2012/068610, filed on Dec. 7, 2012.

(60) Provisional application No. 61/568,731, filed on Dec. 9, 2011.

(51) Int. Cl.
*H05B 37/02* (2006.01)
*H05B 33/08* (2006.01)
*H02M 1/42* (2007.01)
*H02M 3/335* (2006.01)

(52) U.S. Cl.
CPC ......... *H05B 33/0815* (2013.01); *H02M 1/4208* (2013.01); *H02M 3/33507* (2013.01); *Y02B 20/347* (2013.01); *Y02B 20/348* (2013.01)

(58) Field of Classification Search
CPC ........... H05B 33/0815; H05B 33/0818; H05B 37/029; H05B 37/02; H05B 41/3925; H05B 41/391; H05B 41/2828; H05B 33/0803
USPC ............... 315/291, 294, 224, 307; 363/71, 74
See application file for complete search history.

(56) References Cited

U.S. PATENT DOCUMENTS 5,381,077 A * 1/1995 McGuire ...................... 315/247
7,265,499 B2 9/2007 Ball et al.
(Continued)

FOREIGN PATENT DOCUMENTS

KR 10-1082150 B1 11/2011
WO 2013/086445 A1 6/2013

OTHER PUBLICATIONS

Korean Intellectual Property Office (KIPO), International Search Report and Written Opinion, issued on Mar. 22, 2013, for corresponding International Patent Application No. PCT US2012/068610 (pp. 1-10) and claims (pp. 11-14) pp. 1-14.

*Primary Examiner* — Douglas W Owens
*Assistant Examiner* — Syed M Kaiser
(74) *Attorney, Agent, or Firm* — O'Banion and Ritchey LLP; John P. O'Banion

(57) ABSTRACT

A switched-capacitor voltage converter which is particularly well-suited for receiving a line voltage from which to drive current through a series of light emitting diodes (LEDs). Input voltage is rectified in a multi-level rectifier network having switched capacitors in an ascending-bank configuration for passing voltages in uniform steps between zero volts up to full received voltage $V_{DC}$. A regulator section, operating on $V_{DC}$, comprises switched-capacitor stages of H-bridge switching and flying capacitors. A current controlled oscillator drives the states of the switched-capacitor stages and changes its frequency to maintain a constant current to the load. Embodiments are described for isolating the load from the mains, utilizing an LC tank circuit or a multi-primary-winding transformer.

39 Claims, 14 Drawing Sheets

(56) References Cited

U.S. PATENT DOCUMENTS

| | | |
|---|---|---|
| 2002/0027791 A1* | 3/2002 | Yoshioka et al. ............... 363/71 |
| 2004/0189265 A1* | 9/2004 | Rice et al. .................... 323/234 |
| 2007/0024254 A1 | 2/2007 | Radecker et al. |
| 2009/0021175 A1 | 1/2009 | Wendt et al. |
| 2010/0020570 A1 | 1/2010 | Melanson et al. |
| 2010/0283340 A1* | 11/2010 | Fradella ........................ 310/74 |
| 2011/0254461 A1* | 10/2011 | Summerland et al. ........ 315/291 |
| 2012/0049821 A1* | 3/2012 | Hashiguchi et al. .......... 323/282 |

\* cited by examiner

SWITCHED-CAPACITOR ISOLATED LED DRIVER

CROSS-REFERENCE TO RELATED APPLICATIONS

This application is a 35 U.S.C. §111(a) continuation of PCT international application number PCT/US2012/068610 filed on Dec. 7, 2012, incorporated herein by reference in its entirety, which claims priority to, and the benefit of, U.S. provisional patent application No. 61/568,731 filed on Dec. 9, 2011, incorporated herein by reference in its entirety. Priority is claimed to each of the foregoing applications.

The above-referenced PCT international application was published as PCT International Publication No. WO 2013/086445 on Jun. 13, 2013, which publication is incorporated herein by reference in its entirety.

STATEMENT REGARDING FEDERALLY SPONSORED RESEARCH OR DEVELOPMENT

This invention was made with government support under ADEPT DE-AR0000114 awarded by the U.S. Department of Energy (DOE) through the Advanced Research Projects Agency-Energy (ARPA-E). The government has certain rights in the invention.

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation, its rights pursuant to 37 C.F.R. §1.14.

BACKGROUND OF THE INVENTION

1. Field of the Invention

This invention pertains generally to driver circuits, and more particularly to light emitting diode (LED) driver circuits which provide electrical conversion and isolation from supply mains.

2. Description of Related Art

There is significant impetus for shifting toward light emitting diode (LED) lamps within existing fixtures, such as screw-in Edison-bulb type lamps. Residential LED lighting, for example, is an emerging market with several manufacturers producing screw-in retrofit LED lamps for use in standard 120 $V_{rms}$ Edison sockets. Perhaps the greatest share of the overall demand for replacement LED lamp devices is in devices directed at the power range of from 5 to 15 watts.

Space, efficiency and longevity are concerns within these LED lamp devices. In many LED lamps, the overall space available for circuitry may be only approximately 1×1×2.5 inches, with specific dimensions depending upon the particular lamp envelope package. Efficiency considerations are important in view of both providing the highest lumen output for a given power input, and in regard to the necessity of dissipating heat from power that is not converted to light. Nominal lifetimes for these lamps are targeted in the range of up to 50,000 hours.

As LED elements can not be driven directly from an AC line, such as 110 VAC, a conversion circuit is required within the packaging of each lamp device. The conversion circuit should nominally exhibit high electrical conversion efficiency (~90%), with high power factor (meeting the IEC 61000-3-2, part C specification on harmonics), while providing regulated current to a single series string of LED devices.

These LED drive circuits may also require bulk electrolytic capacitance, that is usually considered the weak link in terms of lifetime and reliability of the devices, while also taking up significant circuit space.

Among the many unique challenges to creating lamps for this market, thermal management is perhaps paramount. Unlike incandescent lamps, which operate properly at filament temperatures up to 2500° C., LED junctions are limited to far cooler temperatures, typically less than 100° C. The heat produced by an LED is not directly convected from the front of the LED chip, but instead must be conducted through the back-side of the chip. It is critical to minimize the total thermal resistance from junction to ambient air toward providing adequate cooling of the LED.

It would seem ideal to directly bond the LED devices to a large metal heat sink exposed to the ambient-air to minimize total thermal resistance. Although, in this configuration, the heat sink becomes a safety hazard because many existing fixtures, such as standard Edison sockets, lack an earth (ground) connection. Replacing a metal heat sink with a non-electrically conductive one, such as ceramic, results in significantly lower levels of thermal conductivity. For example, currently proposed ceramics provide thermal conductivity that is still an order of magnitude less than that of common metals, e.g., 24 W/m-K for Rubalit versus 210 W/m-K for aluminum. One solution toward overcoming the isolation problem, when using large metal heat sinks, is to galvanically isolate the LEDs from the AC mains utilizing a transformer. It will be appreciated that galvanic Isolation involves forced isolation between two circuits so that no metal conduction path exists between those circuits. However, using these isolation transformers at the low power line frequencies involved significantly increases circuit size and cost when applied to LED driver circuits.

BRIEF SUMMARY OF THE INVENTION

A switched-capacitor galvanically isolated LED driver circuit is described. The disclosed circuit provides an electrical conversion interface, and means for LED lamp current regulation, when operating from an intermediate voltage bus (e.g., rectified 110 VAC line voltage). The disclosed invention can provide this galvanic isolation at different locations in the system. In one form of isolation, LED devices are in close thermal contact with the heat sink/heat spreader with the LED lamp devices being isolated from the AC electrical service. In another form of isolation a galvanic isolation barrier is created between the LEDs and the heat sink/heat spreader. These embodiments are valuable for enabling simple heat sinking of LED devices, and are particularly well-suited for adapting LED devices for use in existing lighting fixture designs, such as Edison base fixtures. The inventive circuits also include efficient means for matching voltages and providing current regulation.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

The present invention is a switched-capacitor driver circuit which provides isolation from the main supply and is particularly well-suited for use in driving LEDs lamps. One of the objects of the invention is providing a substantial circuit cost reduction by eliminating large transformers, while increasing device lifespan through reduction or elimination of electrolytic capacitors. The following outlines a number of embodiments of these switched-capacitor LED driver circuits which are isolated from supply mains.

Figure 1:
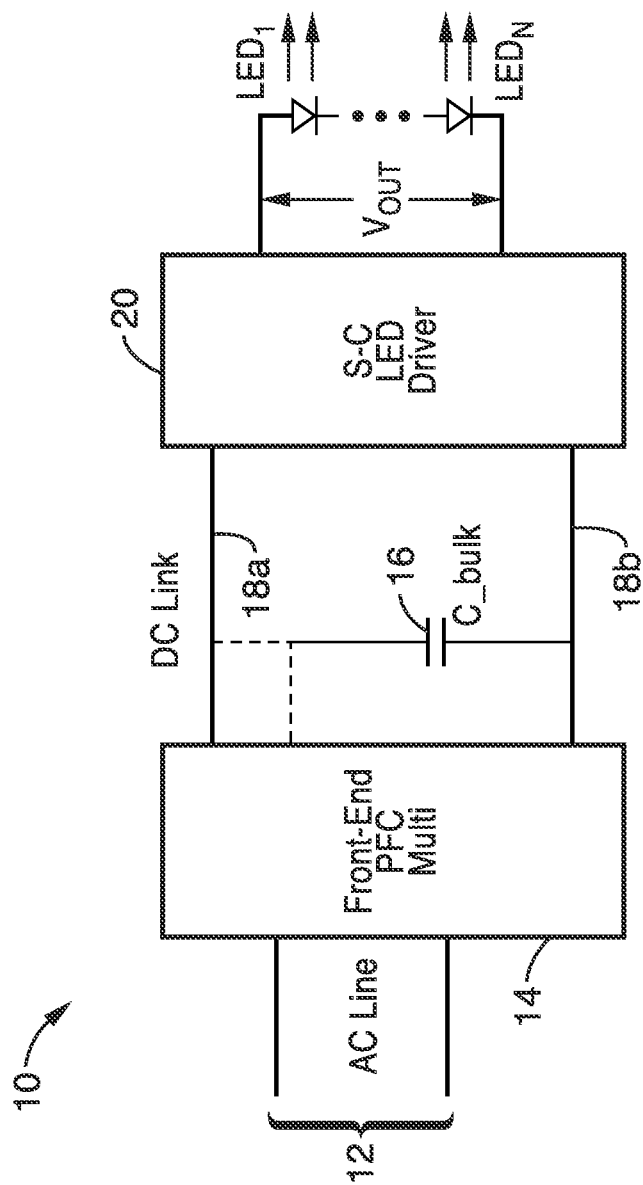
FIG. 1 is a block diagram of an isolated switched capacitor LED conversion and driving circuit according to at least one embodiment of the present invention.

FIG. 1 illustrates an example embodiment 10 of a switched-capacitor driver receiving an input signal 12 (e.g., AC line voltage) into a power factor correction (PFC) rectifier 14, a DC bus or link shown with bulk capacitor 16 between DC lines 18a, 18b, and connecting to an LED driver section 20 with $V_{OUT}$ to a series of LEDs, shown as $LED_1$ through $LED_N$. The DC bus or link in this example, has a voltage in the range of 170-200 V, for a 110 $V_{rms}$ AC line. The figure includes a bulk capacitor that is preferably incorporated to provide energy balance if the LEDs are driven without a double-line-frequency (e.g., 120 Hz) ripple component. Standards may evolve which allow such double-line-frequency ripple to be applied to the LEDs, that would allow further reduction of required energy storage devices (e.g., elimination of bulk capacitors). Dotted lines are shown in the figure indicating that if this bulk capacitor (C_Bulk), is utilized, it need not be connected directly to the DC bus, although this is one of the preferred embodiments.

1. Transformerless Galvanically Isolated Approach

Figure 2:
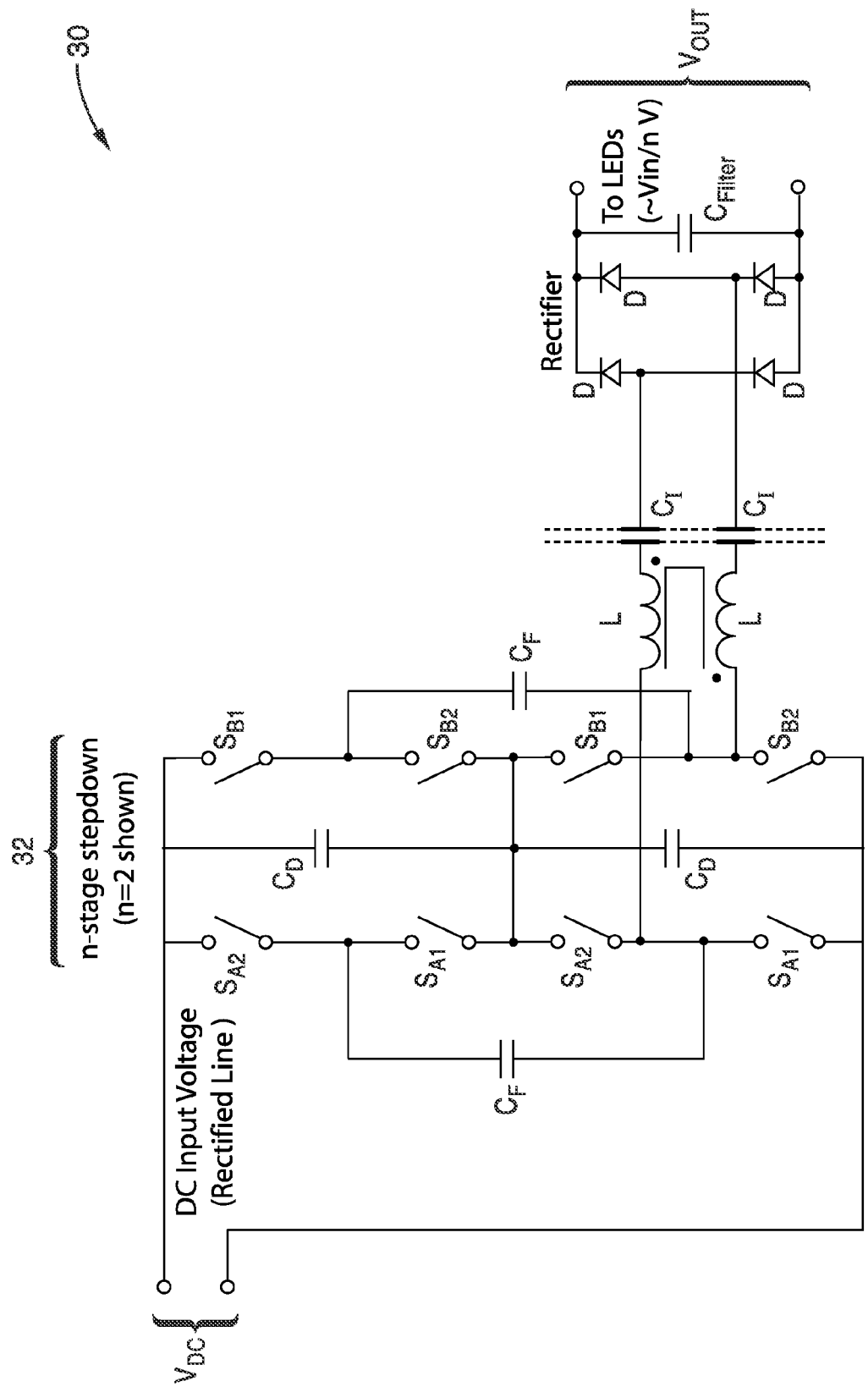
FIG. 2 is a schematic of a switched capacitor converter in which the LEDs are galvanically isolated from the converter according to at least one embodiment of the present invention.

There are many similarities between transformers and capacitive isolation barriers, thus even though there is a need for a step-down converter, there is no direct analogy to turns ratio. A ladder type switched capacitor converter is utilized in which the isolation barrier is interfaced to AC output terminals of the ladder circuit FIG. 2 illustrates an example embodiment 30 of a switched capacitor step-down converter having an n-stage step down 32 utilizing H-bridges and exemplified with two stages for a 2:1 step down. It will be noted that an H-bridge is a switching configuration that enables a voltage to be applied across a load in either direction. A direct current (DC) input $V_{DC}$ is received, such as a rectified line voltage to the step down stages. The first stage comprises the top H-bridge of four switches ($S_{A1}$, $S_{A2}$, $S_{B1}$, $S_{B2}$), and the second stage comprises the lower set of four switches ($S_{A1}$, $S_{A2}$, $S_{B1}$, $S_{B2}$), with the flying capacitors $C_F$, interconnecting the stages. The switches of like marking (e.g., whether $S_{A1}$, or $S_{A2}$) are activated as a group, whereby all of these switches are either switched to On or Off, by the same clocking signal. Energy storage/decoupling capacitors $C_D$ (e.g., bulk capacitors) are shown between the stages, herein exemplified as two capacitors. The embodiment is shown having an integrated series resonant circuit composed of two coupled inductors L, isolation capacitors $C_I$, connected through a rectifier comprising diodes D, with a filter capacitor $C_{Filter}$ to provide $V_{OUT}$ to an LED load with a controlled current flow.

The embodiment shown preferably utilizes safety rated Y1 capacitors, meant for use in series with mains voltage, and are exemplified here in the range of 10 pF to 10 nF. It should be noted that Y1 capacitors are conventionally connected from line to ground. In the event that a Y1 capacitor fails, the potential for electrical shock is present, whereby Y1 capacitors are specified for their high reliability. Y1 capacitors are used with working voltages up 500 VAC and are typically of a low capacitance value. The upper bound is set by the maximum leakage current specification at low frequencies, for example 10 nF at 60 Hz is 265 k-ohms of reactance, limiting the 60 Hz current to less than 1 mA. For a given current handling and efficiency specification, it is desirable to minimize the amount of necessary capacitance to reduce size and cost of isolation components. This is accomplished in the present invention using series resonance with zero voltage switching (ZVS) and increasing switching frequencies, which by way of example and not limitation, is in the range of a few megahertz. The series resonant circuit is formed by placing a discrete inductor in series with the isolation capacitors. The remaining flying capacitors have no constraint on maximum capacitance and have less stringent voltage requirements regarding the level of voltage they can withstand.

Although the circuit of FIG. 2 illustrates a 2:1 step-down, one of ordinary skill in the art will appreciate it can be generalized to n:1 by cascading the unit structure consisting of H-bridge and flying capacitors. It will also be appreciated, that a differential n:1 implementation requires 4n switches and 2(n−1) flying capacitors. The differential architecture nearly eliminates the high frequency common mode signal otherwise present on the isolated side of the converter, which improves EMI compatibility and reduces sensitivity to stray capacitance.

It should be noted that the voltage rating of the flying capacitors and switches scale with the number of stages used. For example, if the input voltage is 170V DC, an n:1 step-down would require the individual switches and capacitors to block only 170/n Volts.

A switched capacitor converter can be modeled as an ideal voltage source in series with a Thévenin-equivalent output resistance. The finite output resistance is due to the non-zero on-resistance of the switches, the ESR of the switched capacitors, and losses associated with charging and discharging capacitors. It is convenient to calculate the Thévenin resistance in fast and slow switching limits, called $R_{FSL}$ and $R_{SSL}$, respectively. The former captures the losses due to the physical resistance in the circuit, while the latter captures losses associated with charging and discharging capacitors. In this circuit, the $R_{FSL}$ and $R_{SSL}$ resistances are calculated at the AC output terminals of the inverter, where the resonant network connects.

For the differential architecture, $R_{FSL}$ and $R_{SSL}$ resistances are given by the following.

$$R_{FSL} = \frac{2R_{on}}{n} \quad (1)$$

$$R_{SSL} = \frac{1}{2fC}\sum_{i=1}^{n-1}\left(\frac{i}{n}\right)^2 \quad (2)$$

where $R_{on}$ is the switch on-resistance, f is the switching frequency, and C is the value of each flying capacitor. The total approximate output resistance of the inverter is then given as follows.

$$R_{out} = R_{FSL} + R_{SSL} \quad (3)$$

These expressions assume the resonant network is connected to the output terminals of the lowest H-bridge in the ladder. The inductor and capacitor, along with associated ESR, are placed in series with $R_{out}$ to form an approximate AC equivalent circuit.

Figure 3:
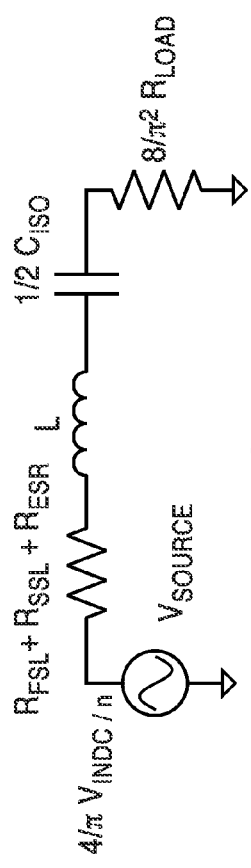
FIG. 3 is a schematic of an equivalent circuit for the switched capacitor step-down converter of FIG. 2.

FIG. 3 illustrates the approximate AC equivalent circuit of switched-capacitor resonant converter. The inverter generates a $\pm V_{INDC}/n$ square wave with primary harmonic amplitude $(4/\pi)V_{INDC}/n$, as seen in the figure. The value $R_{ESR}$ is the equivalent series resistance of the resonant network, fast and slow switching limits are given by $R_{FSL}$ and $R_{SSL}$, L is the total differential inductance of the coupled inductor, $C_{ISO}$ is the value of one isolation capacitor with ½ $C_{ISO}$ present in the equivalent circuit, and $R_{LOAD}$ is the load resistance on the DC side (e.g., of the rectifier shown in the actual circuit of FIG. 2) with a value of $(8/\pi^2)R_{LOAD}$ represented in the equivalent circuit shown. The equivalent circuit of FIG. 3 assumes that all of the power is concentrated in the primary harmonic of the switching frequency. The 4/π factor is the ratio of the primary harmonic of a square wave to its amplitude.

In view of the above, it should be appreciated that a differential 4:1 step-down converter can be implemented using 16 switches and 6 flying capacitors. One implementation of our inventive differential 4:1 step-down converter provides a nominal DC output voltage of 42.5V, with a 12 LED series load totaling about 36.5V. The current through the series resonant network is regulated, with the 6V difference (e.g., 42.5–36.5) between nominal DC output and the load dropped across the residual reactance of the LC network. This regulation strategy is ideally lossless, unlike a pure switched-capacitor circuit, which would require LDO functionality to accomplish the final step-down.

Figure 4:
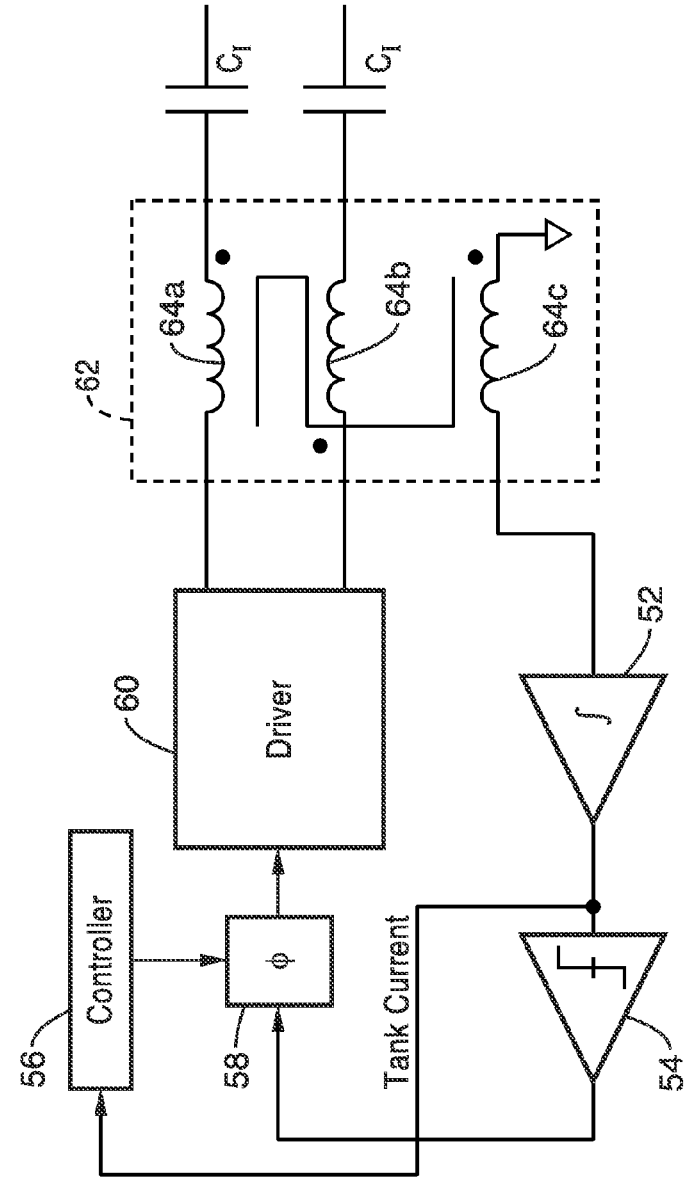
FIG. 4 is a block diagram of an LC oscillator and controller for regulating output current according to at least one embodiment of the present invention.

FIG. 4 illustrates an example embodiment 50 of a series resonant tank current which forms an LC oscillator that provides gating voltages for the switched capacitor converter. The tank current is estimated by integrating, with integrator 52, the voltage across a tertiary winding 64c. A zero crossing detector 54 receives the output of integrator 52, and generates the gate drive signal from the tank current shown entering phase (φ) block 58 which represents a means for adjusting phase shift in the oscillator loop. In the absence of the phase shift block, the oscillation frequency would be the resonant frequency of the tank. A controller 56 is shown receiving the output of integrator 52 and outputting to φ block 58, whose output is coupled to a driver 60 connected to a set of windings 62, having overlapping flux fields. This set of windings 62 comprises windings 64a, 64b and 64c, with the opposing ends of windings 64a, 64b connected to the load through isolation capacitors $C_I$.

The resulting oscillator is controlled using negative feedback to provide constant current to the LED load. Controller 56 senses the amplitude of the tank current, compares it to a reference, and adjusts the phase shift in the oscillator loop. Using sinusoidal analysis, a relationship between the phase shift φ and the input and output voltages of amplitude $V_{in}$ and $V_{out}$, respectively, of the series resonant circuit is given by the following.

$$V_{out} = V_{in}\cos\phi \quad (4)$$

The output voltage is related to the LED current, $I_{out}$, as follows.

$$I_{out} = I_S e^{V_{out}/(knV_T)} \quad (5)$$

where $I_S$, n, and $V_T$ are the reverse saturation current, emission coefficient, and thermal voltage, respectively, associated with the LED and k is the number of LEDs in the output string. The output current is then given by the following.

$$I_{out} = I_S e^{V_{in}\cos\phi/(knV_T)} \quad (6)$$

The above expression shows the exponential dependence of the output current on the phase shift. In view of the symmetry of the cosine function, the circuit should be restricted to always operate above resonance, such as accomplished by proper design of the variable phase shift (delay) element.

An embodiment of a 4:1 step-down 15.5 W LED driver was implemented using discrete parts as summarized in Table 1

(tables found at the end of the specification). The LED load consists of 12 1.3 W green LEDs in series, totaling about 36.5V. This load has an equivalent large signal resistance of $R_{LOAD}$=86, which dictates the allowable $R_{out}$ of the converter, as well as the ESR of the resonant network components.

This example implementation utilizes switches with $R_{on}$=0:5, 1 µF flying capacitors, and a nominal operating frequency of 2.3 MHz giving $R_{FSL}$=0:25, $R_{SSL}$=0:16, $R_{out}$=0: 41. The measured small signal ESR of the 5.7 µH toroid and the 2.7 nF isolation capacitor are about 0.3 ohms and 0.1 ohms respectively. From efficiency measurements, the large signal ESR of the series combination of 2 flying capacitors and toroid is estimated to be about 1. For this example implementation, the output current range was found to be from 44 to 425 mA through adjustment of the outer loop 20.3 kHz PWM duty cycle from 9 to 86%. Over this duty cycle range, the efficiency, including gate-drive losses, varied from 86 to 92%.

Figure 5:
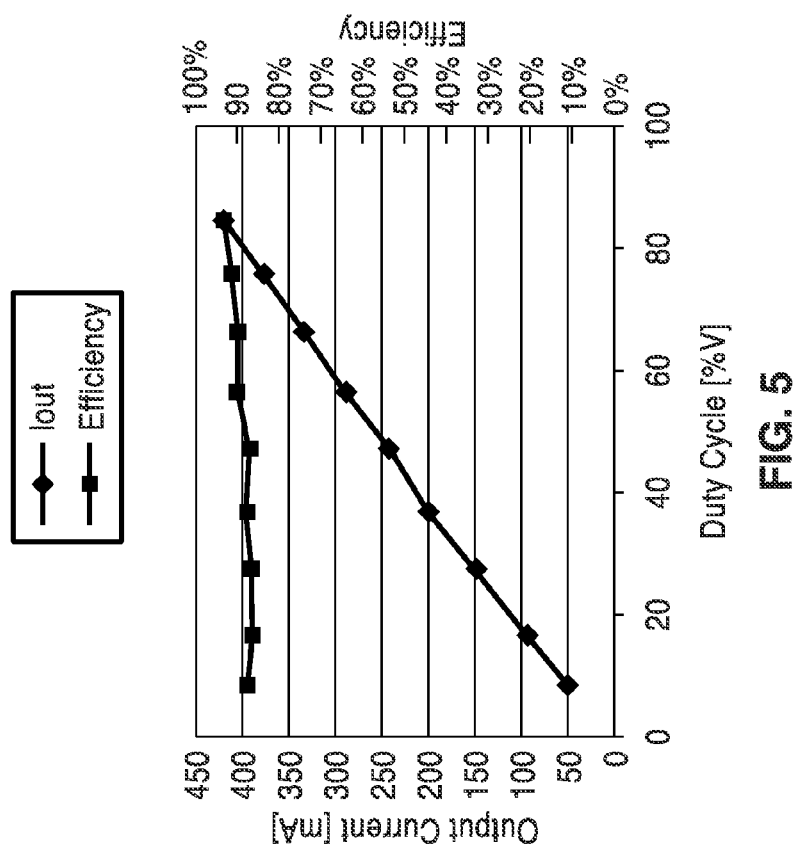
FIG. 5 is a graph of current regulation and efficiency in relation to duty cycle for an example 4:1 step down LED driver implemented according to at least one embodiment of the present invention.

FIG. 5 depicts current regulation and efficiency for the 4:1 step-down 15.5 W LED driver with respect to duty cycle, and clearly shows efficiency near 90% over the range of output current $I_{OUT}$.

Figure 6:
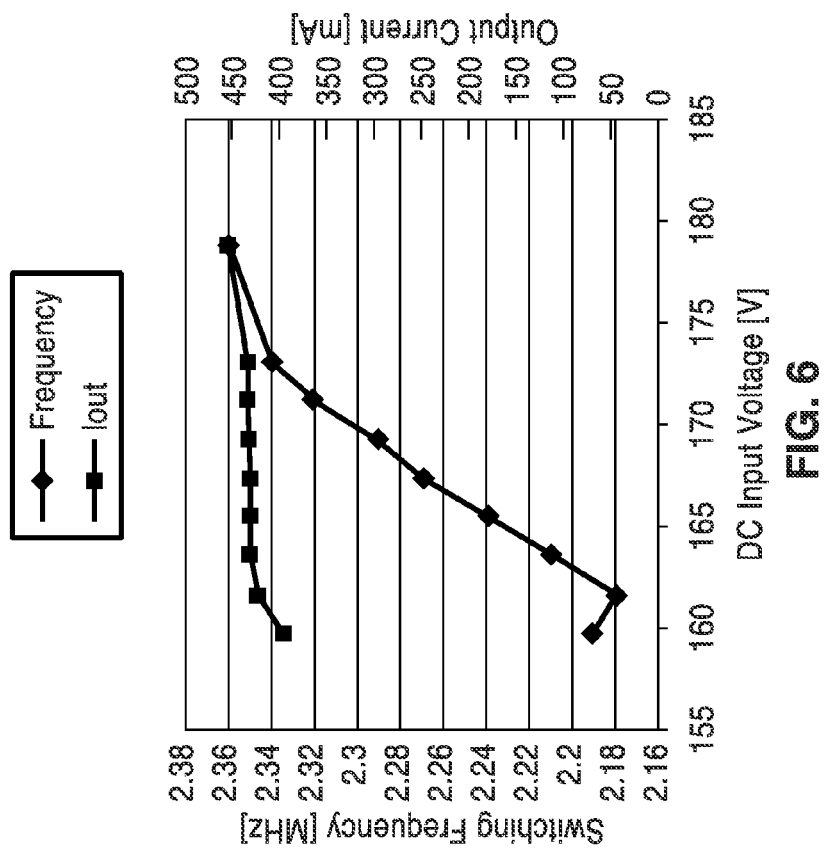
FIG. 6 is a graph of switching frequency and current regulation in relation to duty cycle for an example 4:1 step down LED driver implemented according to at least one embodiment of the present invention.

FIG. 6 depicts switching frequency and current regulation for the 4:1 step-down 15.5 W LED driver with respect to input voltage, showing the small changes to oscillator frequency with over the range of output current $I_{OUT}$.

From these graphs it will be seen that the output current is regulated down to 10% for a range of input voltages from 160 to 180V through adjustment of duty cycle. The change in duty cycle causes the switching frequency to vary between 2.19 and 2.36 MHz.

Thus, in the above embodiment, oscillator duty cycle and frequency change toward adjusting LED driver current. It should be noted that the duty cycle described above is a low frequency process that operates to enable and restart the oscillator, and is not the duty cycle of the switch control waveforms. However, it should be appreciated by one of ordinary skill in the art that LED current can be regulated in response to changing oscillator duty cycle and/or frequency, or even other oscillator parameters including phase shifting, without departing from the teachings of the present invention.

Figure 7:
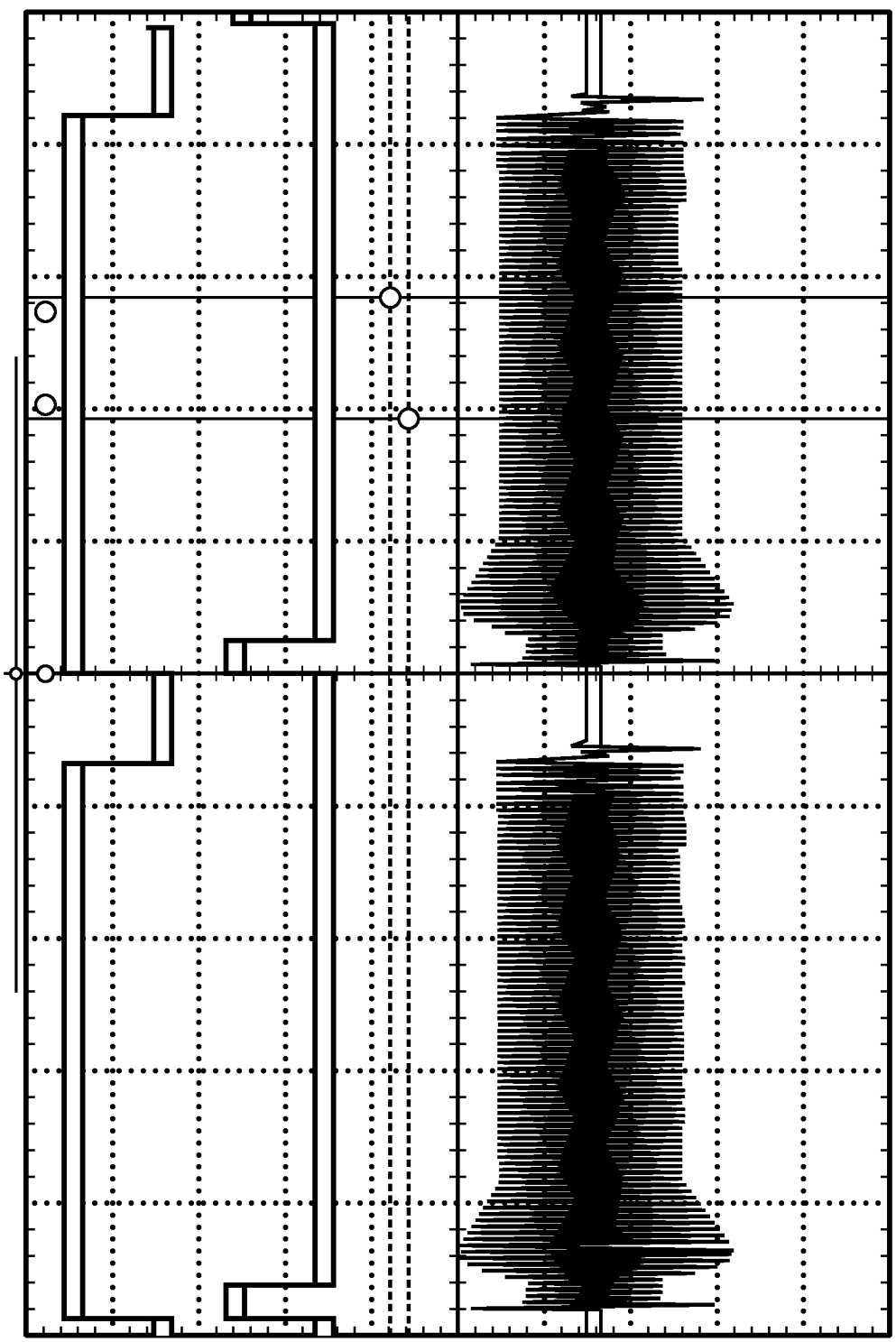
FIG. 7 is a waveform showing Enable, Startup, and drive current through isolation capacitors for an example 4:1 step down LED driver implemented according to at least one embodiment of the present invention.

FIG. 7 depicts output current settling to within 10% of set point in 8 µs after a 2 µs start-up phase. The graph shows a global ENABLE signal (top signal), a STARTUP signal (middle signal), and Current through isolation capacitors (bottom signal).

Figure 8:
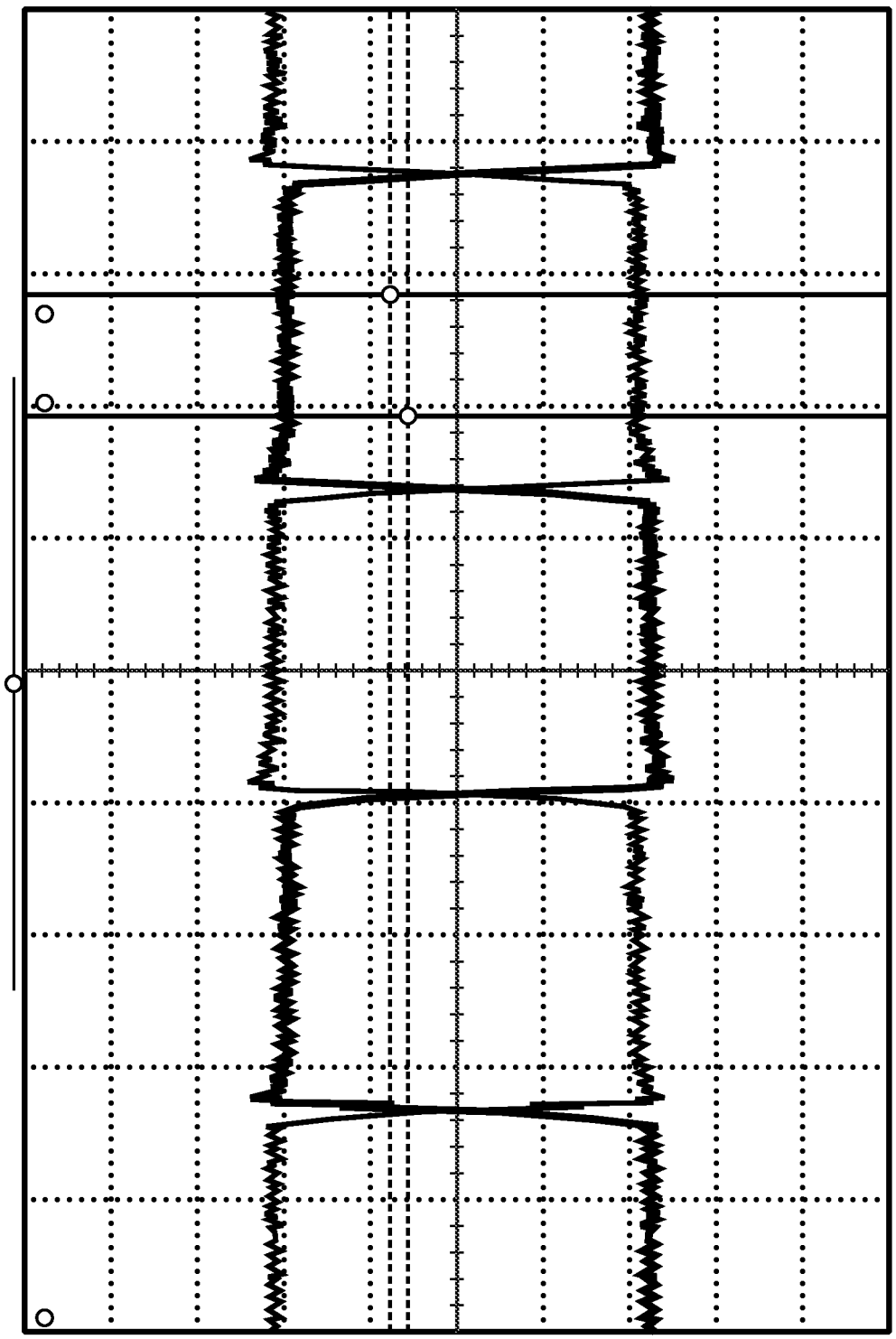
FIG. 8 is a waveform showing switched-capacitor ladder circuit output for an example 4:1 step down LED driver implemented according to at least one embodiment of the present invention.

FIG. 8 depicts zero voltage switched ladder circuit output voltage for both halves of the H-bridge which allows voltage to be applied across a load in either direction.

A ladder-based switched capacitor circuit can be modified to operate with series resonance to enable reduction of the size of the isolation capacitors. The ladder circuit provides the necessary voltage step-down and divides the peak voltage stress among the active components. The tank current amplitude provides a stable estimate of the LED current and can be used for primary-side regulation. The control scheme is compatible with allowing large voltage ripple on the DC bus.

2. Capacitively Isolated Hybrid Switched-Capacitor Resonant Circuit

Figure 9:
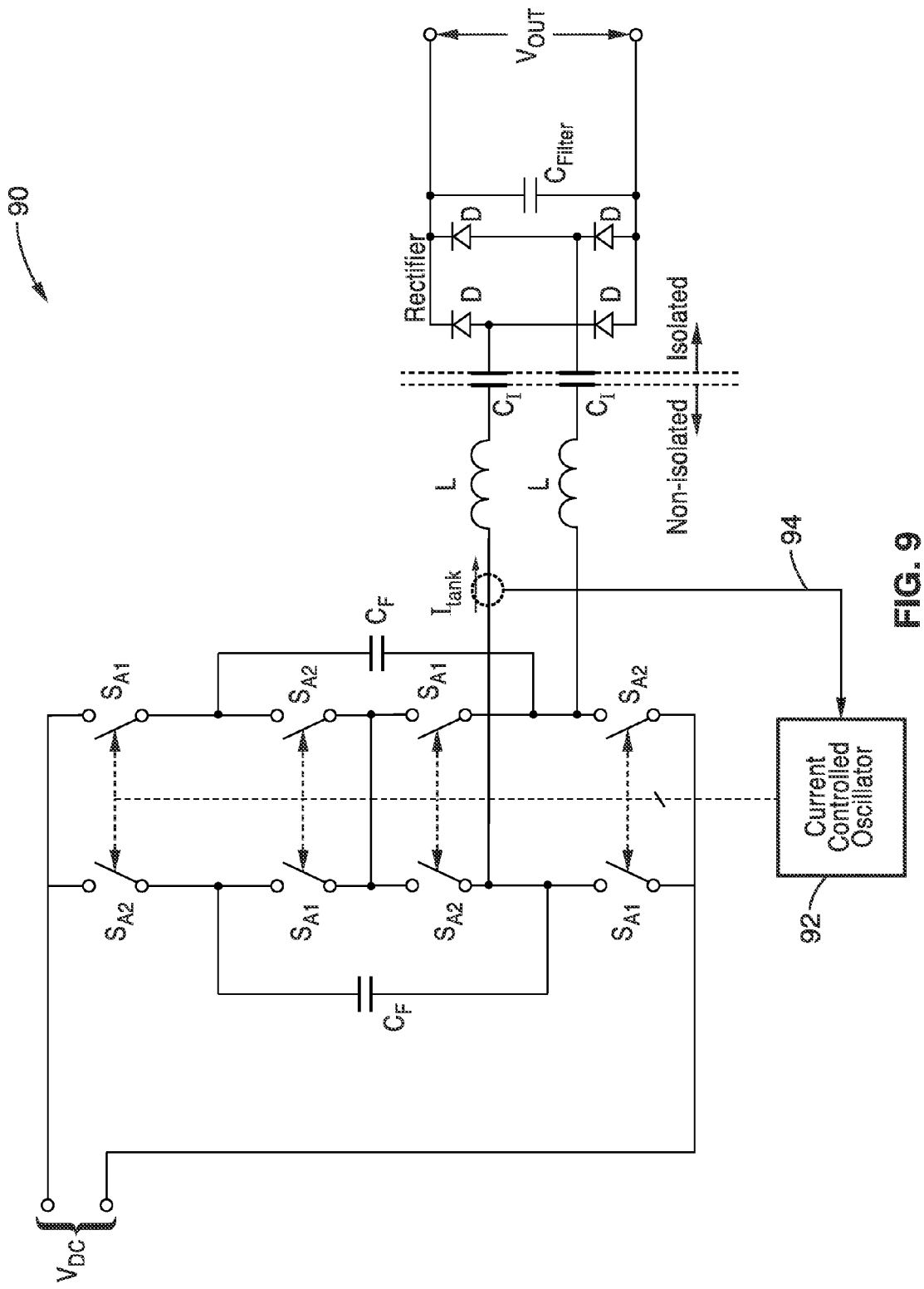
FIG. 9 is a schematic of a switched-capacitor converter according to at least one embodiment of the present invention, showing a current controlled oscillator controlling the activation of the capacitor switching stages.

FIG. 9 illustrates an example embodiment 90 of a capacitively isolated hybrid switched-capacitor resonant circuit, that is fed by the rectified DC link voltage seen in FIG. 1, and is designed to drive a string of LEDs connected to $V_{OUT}$ at desired current levels. This circuit is similar to that shown in FIG. 2, exemplified herein without the energy storage capacitors $C_D$, yet showing a current controlled oscillator 92 which controls the state of switch groups $S_{A1}$, $S_{A2}$ within the upper and lower H-bridges of the first and second stepdown stages.

The left side of the figure comprises a double-ended switched capacitor ladder circuit, exemplified as a two-stage ladder of switches in groups $S_{A1}$, $S_{A2}$ and flying capacitors $C_F$, allowing a step down in voltage by two. This should be thought of as generalizable to many stages of step down to allow convenient matching between the DC line voltage and the nominal LED string voltage. The second stage of this hybrid circuit is a series resonant stage. This is also double-ended, as illustrated in the figure, whereby galvanic isolation results from using a pair of capacitors $C_I$ in the resonant stage. It should be noted that each of these two resonant capacitors must be rated to provide the required isolation voltage, such as 3 kV. The utilization of the ladder step down stage enables the series resonant converter stage to operate at or near its maximum efficiency. This is the case since the series resonant stage then only needs to step down voltage over a fairly narrow range, for example over the range of 0.7 to 0.9.

By setting the switching frequency for this circuit to be above resonance, it is possible and practical to effect soft switching (zero-voltage) on all the switch devices in the circuit. As such, switching is nearly lossless and EMI generation is less severe than in some hard switched cases.

The circuit includes a current controlled oscillator (controller) 92 that tunes frequency appropriately for operation above resonance, in response to measured or estimated LED string current 94, which is exemplified as sensing $I_{tank}$, although other means of sensing can be utilized without limitation. The state of switches $S_{A1}$, $S_{A2}$ is controlled by switch control signals from the controller 92.

Figure 10:
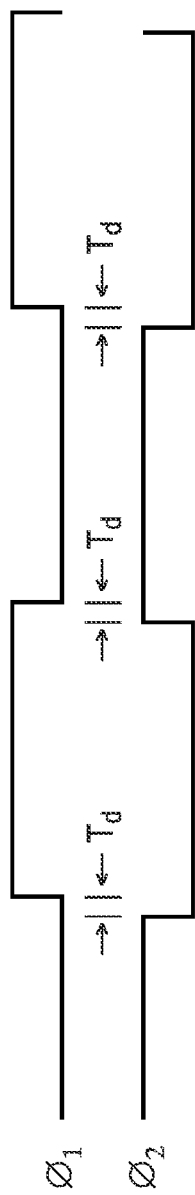
FIG. 10 is a timing diagram for two phases of switching signals for the switched-capacitor converter embodiment of FIG. 9.

FIG. 10 illustrates non-overlapping clock signals $\phi_1$ and $\phi_2$, which respectively drive the state of switch groups $S_{A1}$ and $S_{A2}$. By way of example and not limitation, the timing diagram is shown using positive clock signals in which the corresponding switch is turned on in response to a high signal and off with a low signal. These signals are shown being generated with a slight dead time (delay) $T_d$ which prevent short circuit current flow. One of ordinary skill in the art will appreciate that each of the embodiments described herein will utilize some similar form of switch state control circuit. It should also be noted that in driving a switched capacitor device additional switch control signals are required as the number of stages of switched capacitors are incorporated.

LED current can be adjusted over a substantial range with this control loop, but efficiency is negatively impacted at lower LED load currents due to sustained switching operation and eventual loss of soft-switching. High efficiency regulation of LED current over orders of magnitude can be readily achieved by modulating the operation of the circuit with a lower frequency on-off scheme, for example based on pulse-width modulation (PWM). This modulation can also be used to drive a double-line frequency (e.g., 120 Hz) LED current component to match input power flow, and thus avoid utilization of energy storage in the DC bus capacitance.

The circuit of FIG. 9 was built and tested, with its key powertrain components listed in Table 2. Significantly, the resonant isolation capacitors in this example are 2.7 nF X7R ceramic capacitors rated at 3 kV, in a 3640 surface mount package, while the resonant inductors are actually realized with two windings on a single 0.5 inch diameter powdered iron core. These control circuit and other powertrain components of this implementation were selected for operation at a nominal frequency of 2 MHz. Higher operating frequencies are readily realizable with integrated circuit implementations whereby the passive powertrain components can be reduced in value and size.

Figure 11:
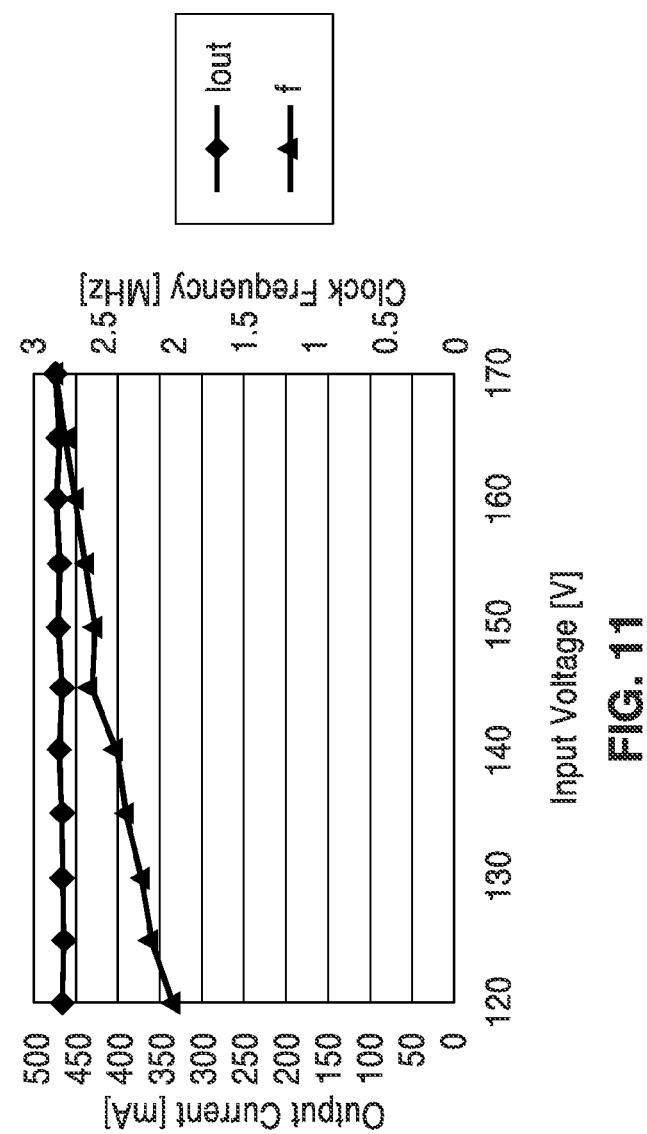
FIG. 11 is a graph of output current for the switched-capacitor converter embodiment of FIG. 9.

FIG. 11 depicts regulation performance of the switched capacitor resonant LED driver of FIG. 9. It can be seen that the output current (top graph line with diamond symbol datum points) remains very stable across a range of input voltage from 120 to 170 volts, while the frequency of oscillation (bottom graph line with triangle symbol datum points) increases from about 2 MHz to about 3 MHz over that same voltage range to maintain the constant current output.

Figure 12:
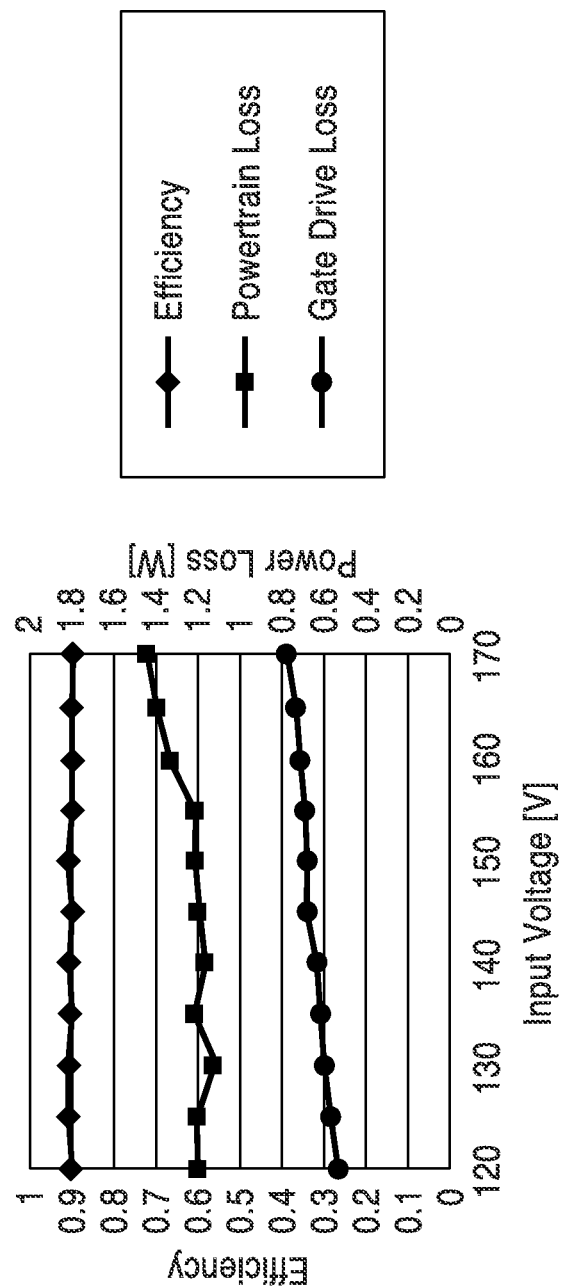
FIG. 12 is a graph of efficiency for the switched-capacitor converter embodiment of FIG. 9.

FIG. 12 depicts efficiency, power train loss and gate driver loss for this FIG. 9 switched capacitor resonant LED driver. It can be seen in the graph that efficiency (top line with diamond datum points) remains at about 90% across the voltage range from 120 to 170 volts, while power train loss (middle line with square datum points) varies from 0.6 to 1.4 Watts, and gate drive loss (bottom line with circle datum points) varies from about 0.3 to near 0.8 Watts.

Figure 13:
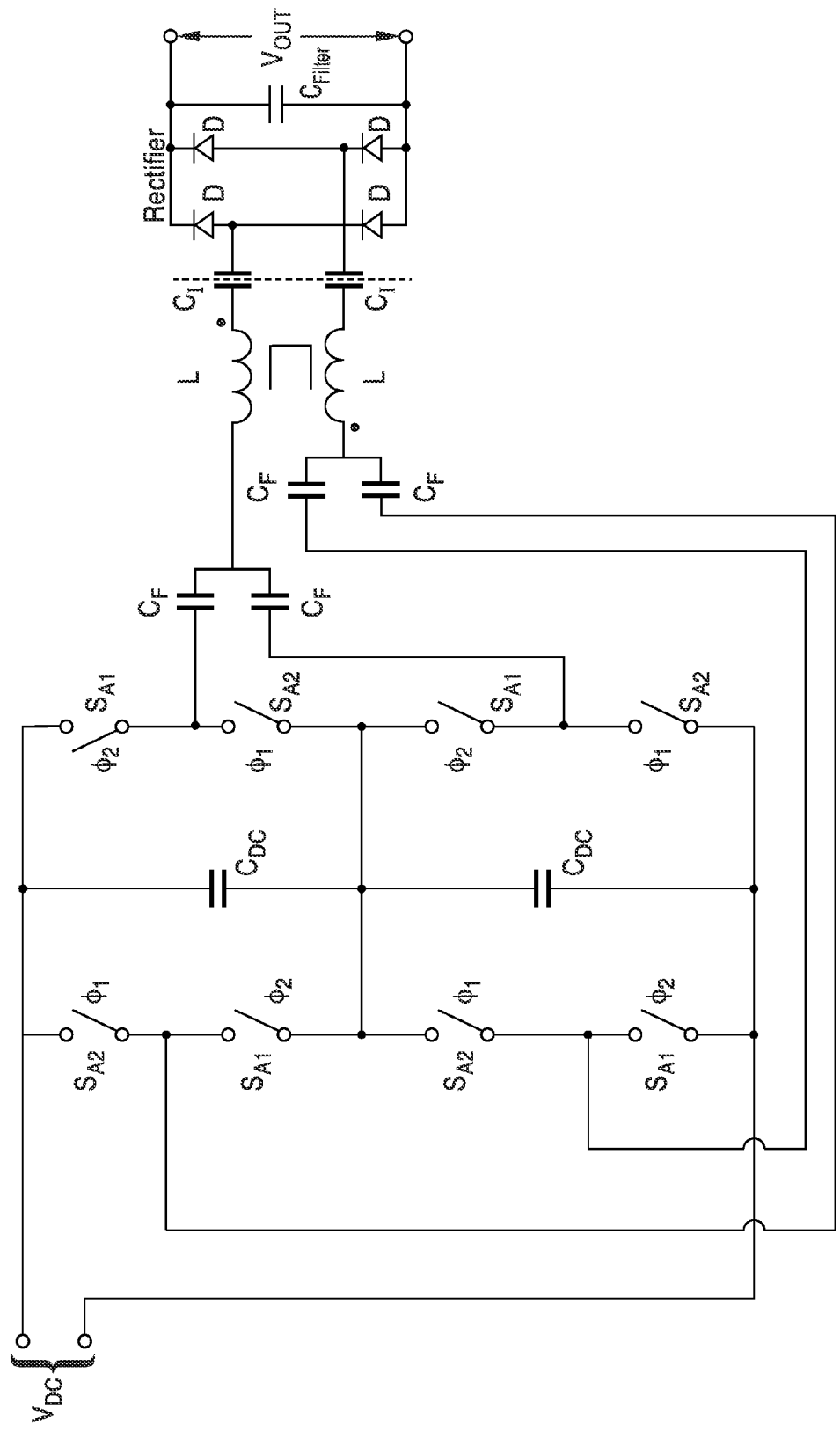
FIG. 13 is a schematic of a switched-capacitor converter utilizing a star topology of the flying capacitors, according to at least one embodiment of the present invention.

FIG. 13 illustrates an embodiment of a switched capacitor converter utilizing a different configuration of the flying capacitors, referred to as a star topology. It should be appreciated that the present invention contemplates connecting the flying capacitors, in other than the series arrangement shown in FIG. 2 and FIG. 9. FIG. 13 shows utilizing the same switch groups ($S_{A1}$, $S_{A2}$) yet with capacitors $C_F$ placed in a star connection topology with the common star point meeting the inductor L. These flying capacitors then function as paralleled resonant caps, and when matched, provide equal sharing of the resonant load current among the "flying" voltage nodes in the stack. The remainder of the circuit showing isolation capacitors $C_I$, diodes D, and capacitor filter $C_{Filter}$ are shown identical to that of FIG. 2 and FIG. 9, and showing non-overlapping clock signals $\phi_1$ and $\phi_2$ driving the state of switch groups $S_{A1}$ and $S_{A2}$.

3. Resonant Switched Capacitor LED Driver with PFC.

This section describes more complete examples of resonant switched-capacitor LED driver circuit topology which provide power factor correction.

Figure 14:
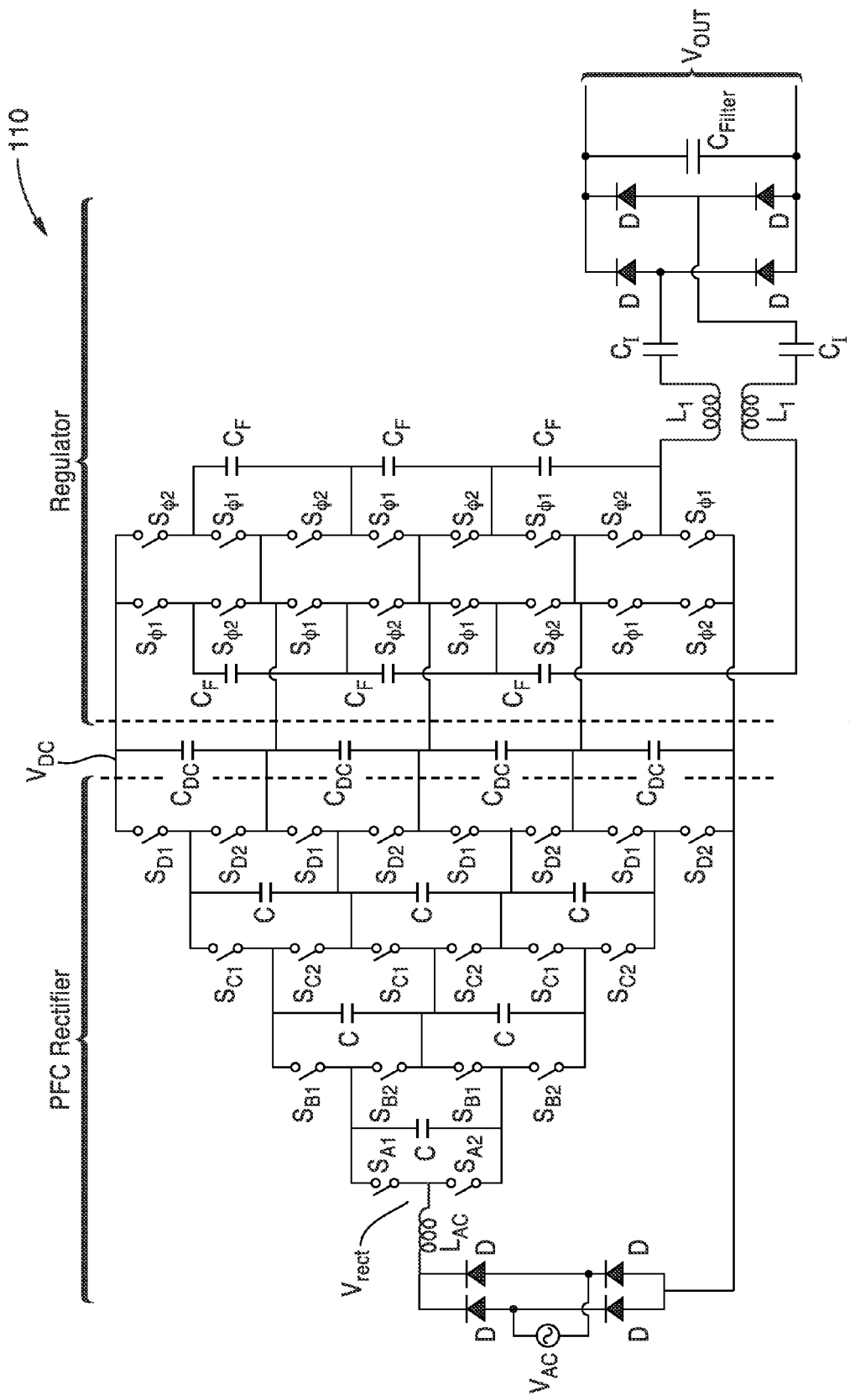
FIG. 14 is a schematic of a switched-capacitor converter according to at least one embodiment of the present invention, showing resonant tank with capacitive galvanic isolation.

FIG. 14 illustrates an example embodiment 110 of switched-capacitor LED driver circuit topology having a PFC rectifier and the load galvanically isolated using capacitors. Line voltage ($V_{AC}$) is rectified by a bridge of four diodes D, with the rectified line voltage being fed into a multilevel boost power factor correction (PFC) rectifier, directed toward correcting the power factor, and comprising bank A (switch groups $S_{A1}$, $S_{A2}$), bank B (switch groups $S_{B1}$, $S_{B2}$), bank C (switch groups $S_{C1}$, $S_{C2}$), and bank D (switch groups $S_{D1}$, $S_{D2}$), with capacitors C interconnecting portions of each bank. It will be seen that each successive bank contains two additional switches, which is referred to herein as an ascending-bank configuration. It will be appreciated that in an AC power system, a load with a low power factor draws more current than a load with a high power factor for the same amount of useful power transferred. The higher currents associated with a low power factor increase the energy lost in the distribution system, which is undesirable and further will not meet international standards, such as IEC 61000.

The regulator portion of the circuit on the right hand side, comprising switch groups $S_{\phi1}$, $S_{\phi2}$ and flying capacitors $C_F$, operates in the same manner as that described previously in FIG. 2 and FIG. 9, however, in this example four stages are seen with the stack of four H-bridges of switching interconnected with the flying capacitors.

Principle components of this switched-capacitor LED driver circuit are the input bridge diode rectifier of four diodes D, the small boost inductor $L_{AC}$, and the multilevel rectifier network comprising four stages (A, B, C and D) of switching, $S_{A1}$, $S_{A2}$, $S_{B1}$, $S_{B2}$, $S_{C1}$, $S_{C2}$, $S_{D1}$, $S_{D2}$, and capacitors C shown on the left hand side of the capacitors $C_{DC}$, as so called "DC capacitors".

In each switch stage of the multilevel rectifier network, (A, B, C, and D), the 1 and 2 subscripted switches are enabled with a complementary binary control. Voltage $V_{DC}$ is obtained by applying a control code that selects ON the $S_{A1}$, $S_{B1}$, $S_{C1}$, and $S_{D1}$ switches, with the complementary switches $S_{A2}$, $S_{B2}$, $S_{C2}$, and $S_{D2}$ OFF. Voltage $3V_{DC}/4$ is obtained by selecting ON any 3 of the 4 switch sets ($S_{A1}$, $S_{B1}$, $S_{C1}$, and $S_{D1}$). Voltage $V_{DC}/2$ is obtained by selecting ON any 2 of the switch sets ($S_{A1}$, $S_{B1}$, $S_{C1}$, and $S_{D1}$), Voltage $V_{DC}/4$ is obtained by selecting ON any 1 of the 4 switch sets ($S_{A1}$, $S_{B1}$, $S_{C1}$, and $S_{D1}$). Zero voltage is obtained by selecting all switches in the set ($S_{A1}$, $S_{B1}$, $S_{C1}$, and $S_{D1}$) OFF.

The multilevel rectifier network permits voltages in uniform steps of zero, $V_{DC}/4$, $2V_{DC}/4$, $3V_{DC}/4$, and $V_{DC}$ to be imposed on the right hand side of the inductor, where $V_{DC}$ is the total voltage on the stack of DC capacitors. The voltage on the left hand side of the boost inductor ($L_{AC}$) is the rectified line voltage. Thus, the voltage across the boost inductor is well defined by the rectified line voltage and the controlled voltage supplied on the right hand side. The boost inductor smoothes the input current drawn from the line and delivered to the stack of DC capacitors. In comparison to conventional boost power factor correction (PFC) rectifiers, this circuit exhibits lower switching stress permitting use of either a smaller inductor and/or lower frequency switching action, while sustaining much reduced switching loss. The circuit is conveniently enabled by the available stack of capacitors already present in the DC side of the switched capacitor LED drivers.

It should be noted that this multiple stage resonant switched-capacitor LED driver circuit is preferably driven by a similar controller as shown in FIG. 9 (block 92), however, it is configured for outputting additional signals for the different banks of switches. For example, in addition to the signals generated for regulation in controlling switch groups $S_{\phi1}$, $S_{\phi2}$ additional digital signals are generated for switch groups $S_{A1}$ and $S_{A2}$, $S_{B1}$ and $S_{B2}$, $S_{C1}$ and $S_{C2}$, as well as $S_{D1}$ and $S_{D2}$ as complementary non-overlapping multiplex address signals. The rectified voltage $V_{rect}$, being given by $$\left(\frac{A+B+C+D}{4}\right) \cdot V_{DC},$$

where A=1 if $S_{A1}$ is active and A=0 if $S_{A2}$ is active, with analogous operation for switch banks B, C and D. Signals A, B, C and D driving these banks of switches change synchronously with the input-side sigma-delta sampling clock. More generally, any number of banks can be supported in the multilevel rectifier with output $$V_{rect} = \left(\frac{R_{Bk1} + R_{Bk2} + \ldots + R_{Bkn}}{n}\right) \cdot V_{DC},$$

wherein $R_{Bk1}$ through $R_{Bkn}$ represent n switch banks of the rectifier. This clock can be asynchronous with the DC-DC ($\phi_1$, $\phi_2$) clock, or synchronous, or even subsynchronous (e.g., synchronous with a fractional clock) as desired to suit the application.

Figure 15:
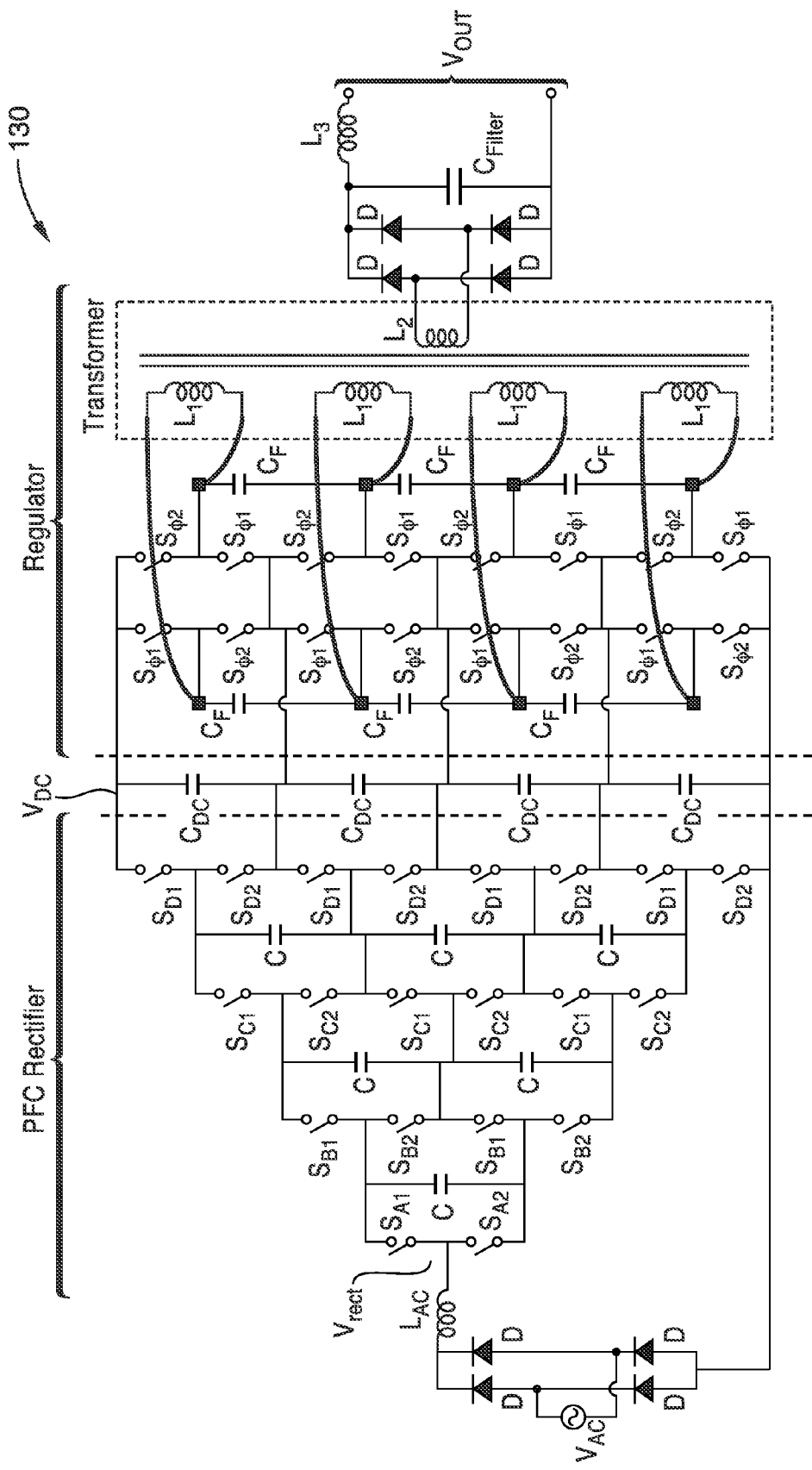
FIG. 15 is a schematic of a switched-capacitor converter according to at least one embodiment of the present invention, showing use of a multi-winding primary side transformer for galvanic isolation.

It should be appreciated that the embodiment of FIG. 14 and FIG. 15, may also be implemented using other connections of the flying capacitors, such as was described regarding FIG. 13.

FIG. 15 illustrates an example embodiment 130 of switched-capacitor LED driver circuit topology in which the resonant network is replaced with a multi-primary-winding transformer. The PFC rectifier portion is shown with the same four banks (A, B, C, and D) of switches in groups ($S_{A1}$, $S_{A2}$, $S_{B1}$, $S_{B2}$, $S_{C1}$, $S_{C2}$, $S_{D1}$, $S_{D2}$) and capacitors C as in FIG. 13. Multiple (e.g., exemplified with four) DC capacitors $C_{DC}$ are seen in a stage between the PFC rectifier and regulator stages. The regulator portion on the right side is shown with the same four stages (four H-bridges of switching) of switches in groups $S_{\phi1}$, $S_{\phi2}$, yet with each stage individually coupled to the output stage through each of multiple primary windings $L_1$ of the multiple-primary transformer having four $L_1$ primary windings and an $L_2$ secondary winding leading to a diode bridge (four diodes D) parallel filter capacitor $C_{Filter}$ and series inductor $L_3$, to output $V_{OUT}$.

The use of the multiple-primary transformer enables galvanic isolation while also conveniently providing a simple mechanism for charge balancing on the string of DC capacitors. The combination of leakage inductance and magnetizing inductance provide for soft-switching, also referred to as zero voltage switching (ZVS), of the active devices in the DC side of the circuit.

Preferred implementations include the inductor $L_3$ directly connected to the output diode rectifier (four D) and filter capacitor $C_{Filter}$ to provide a current source load to this bridge rectifier. As such, the output load current flowing through $L_3$ enables part of the zero-voltage switching action of the DC-DC network, with the action completed by the leakage (and magnetizing) inductances of the multi-winding transformer.

Figure 16:
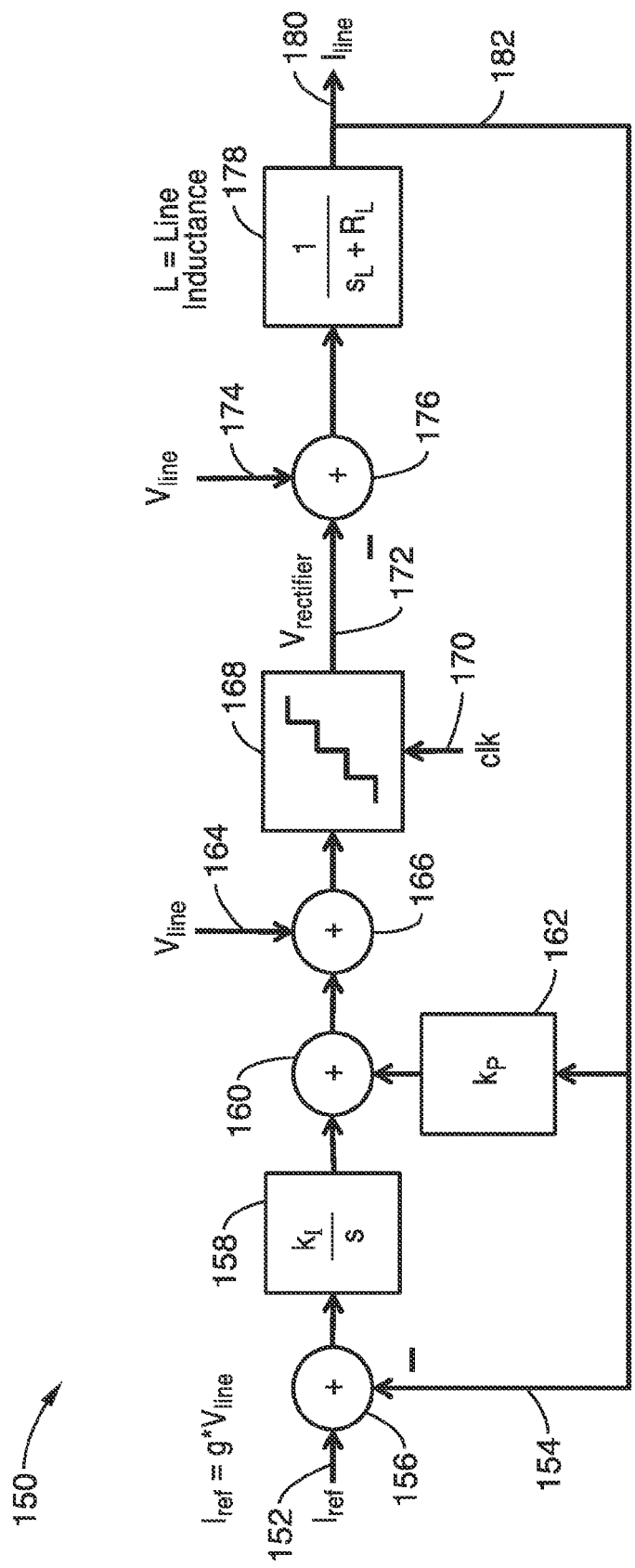
FIG. 16 is a block diagram of a sigma delta power factor correction (PFC) control loop according to at least one embodiment of the present invention.

FIG. 16 illustrates an embodiment 150 of a sigma-delta controller for the multilevel rectifier providing power factor correction when used in combination with the other circuit elements (e.g., inductors), of the switched capacitor LED drivers described. Element 168 is the representation of the multilevel clocked quantizer and the translation of this signal to the voltage on the right hand side of the boost inductor of FIG. 14 and FIG. 15. The sigma delta clock signal is labeled 170. The voltage output 172 of the multilevel rectifier appears across the boost (line) inductance 178 from the rectified line voltage 174, and this voltage difference is modeled with the differential summing node 176. The boost inductor current 180 is sampled as signal 182. This inductor current signal 182 and 154 is subtracted in 156 from the current reference signal 152. The current reference signal is formed by scaling the rectified line voltage by intensity gain factor g. The error signal formed at the output of 156 is integrated in 158, and then summed in 160 with the proportionally scaled current signal at output of proportional gain block 162. The resulting signal is combined with a feedforward line voltage signal 164 in summing node 166. The result forms the signal input to the multilevel quantizer in 168.

Figure 17:
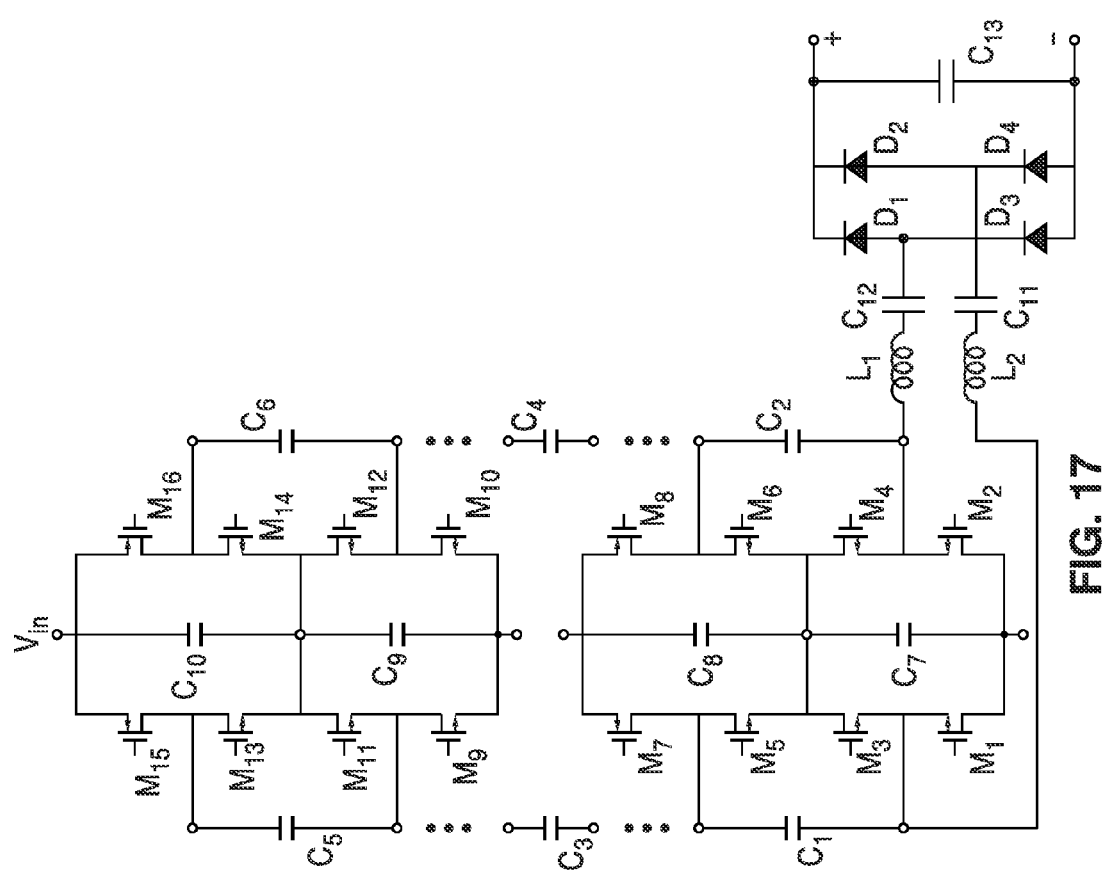
FIG. 17 is a schematic of transistor switching within a multistage switched-capacitor converter according to at least one embodiment of the present invention.

FIG. 17 illustrates an embodiment showing how a 4-stage regulator comprises stages of H-bridge switching using MOSFETs $M_1$ through $M_{16}$ for the switches with H-bridges interconnected with flying capacitor marked $C_1$ through $C_6$. A capacitor isolation is shown in the figure with series inductors $L_1$, $L_2$ and isolation capacitors $C_{11}$, $C_{12}$ rectified in a bridge of diodes $D_1$ through $D_4$, whose DC output is filtered by filter capacitor $C_{13}$.

From the discussion above it will be appreciated that the invention can be embodied in various ways, including the following:

1. A switched-capacitor voltage converter apparatus, comprising: a current regulator having at least two H-bridge switch stages interconnected with capacitors, each said H-bridge stage configured for receiving an input voltage and generating a predetermined output current; and a current controlled oscillator which generates two phase outputs for driving states in said H-bridge switch stages; wherein said current controlled oscillator is configured for sensing current delivered to a load and changing duty cycle and/or frequency of said current controlled oscillator to maintain a predetermined load current.

2. The apparatus of any of the previous embodiments, wherein said apparatus is configured for connection to light emitting diodes (LEDs).

3. The apparatus of any of the previous embodiments, wherein said apparatus is configured to drive multiple light emitting diodes (LEDs) in series.

4. The apparatus of any of the previous embodiments, where said input voltage comprises a rectified line voltage.

5. The apparatus of any of the previous embodiments, further comprising a tank circuit comprising at least one inductor and one capacitor on each of a first and second output of said current regulator.

6. The apparatus of any of the previous embodiments, further comprising a multi-primary-winding transformer having a separate primary winding connecting across each H-bridge stage of said current regulator, and a secondary winding with an output configured for driving current through the load.

7. The apparatus of any of the previous embodiments, further comprising a multi-level rectifier network comprising banks of switched capacitors in an ascending bank configuration for correcting power factor of an input voltage prior to receipt by said current regulator.

8. The apparatus of any of the previous embodiments, wherein said ascending bank configuration of said multi-level rectifier network comprises banks of switches with associated capacitor, with each successive bank containing two additional switches and one additional capacitor.

9. The apparatus of any of the previous embodiments, wherein switches associated with said switched capacitors of said multi-level rectifier network are configured to be switched on and off in either a first group or a second group.

10. The apparatus of any of the previous embodiments, wherein said multi-level rectifier network is configured for passing voltages in uniform steps between zero volts up to full received voltage.

11. The apparatus of any of the previous embodiments, further comprising a boost inductor connected between said input voltage and said multi-level rectifier network to smooth current drawn from said input voltage.

12. A switched-capacitor voltage converter apparatus with power-factor correction, comprising: a multi-level rectifier network receiving a line voltage; a current regulator configured for driving an LED load of one or more light emitting diodes (LEDs) at a desired load current; said multi-level rectifier network having banks of switched capacitors in an ascending bank configuration for correcting power factor of the line voltage being rectified prior to receipt by said current regulator; said current regulator having at least two H-bridge switch stages interconnected with capacitors; a current controlled oscillator which generates two phase outputs for driving states in said H-bridge switch stages of said current regulator, and said banks of switched capacitors in said multi-level rectifier network; a resonant LC tank circuit coupled to said current regulator; wherein said current controlled oscillator is configured for sensing current delivered to the LED load and changing duty cycle and/or frequency of said current controlled oscillator to maintain the desired load current through said resonant LC tank circuit to the LED load.

13. The apparatus of any of the previous embodiments, wherein said LC tank circuit comprises at least one inductor and one capacitor on each of a first and second output of said current regulator.

14. The apparatus of any of the previous embodiments, wherein said ascending bank configuration of said multi-level rectifier network comprises banks of switches with associated capacitor, with each successive bank containing two additional switches and one additional capacitor.

15. The apparatus of any of the previous embodiments, wherein switches associated with said switched capacitors of said multi-level rectifier network are configured to be switched on and off in either a first group or a second group.

16. The apparatus of any of the previous embodiments, wherein said multi-level rectifier network is configured for passing voltages in uniform steps to said current regulator, wherein said voltages are between zero volts up to full voltage received at said multi-level rectifier network.

17. A switched-capacitor voltage converter apparatus with power-factor correction, comprising: a multi-level rectifier network receiving a line voltage; a current regulator configured for driving an LED load of one or more light emitting diodes (LEDs) at a desired load current; said multi-level rectifier network having banks of switched capacitors in an ascending bank configuration for correcting power factor of the line voltage being rectified prior to receipt by said current regulator; said current regulator having at least two H-bridge switch stages interconnected with capacitors; a current controlled oscillator which generates two phase outputs for driving switch states in said H-bridge switch stages of said current regulator, and said banks of switched capacitors in said multi-level rectifier network; a multi-primary-winding transformer having a separate primary winding connecting across each H-bridge stage of said current regulator, and a secondary winding with an configured for driving current through the LED load; wherein said current controlled oscillator is configured for sensing current delivered to the LED load and changing oscillator duty cycle and/or frequency to maintain the desired load current through said multi-primary winding transformer to the LED load.

18. The apparatus of any of the previous embodiments, wherein said ascending bank configuration of said multi-level rectifier network comprises banks of switches with associated capacitor, with each successive bank containing two additional switches and one additional capacitor.

19. The apparatus of any of the previous embodiments, wherein switches associated with said switched capacitors in said multi-level rectifier network are configured to be switched on and off in either a first group or a second group.

20. The apparatus of any of the previous embodiments, wherein said multi-level rectifier network is configured for passing voltages in uniform steps to said current regulator, and wherein said voltages are between zero volts up to full voltage received at said multi-level rectifier network.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112 unless the element is expressly recited using the phrase "means for" or "step for".

TABLE 1

Example Parts on 4:1 Step Down LED Driver

| Component | Part No. | Desc. | Size | Qty. |
|---|---|---|---|---|
| Switch | IRLML2060 | 60 V 0.5 ohm | 6 mm$^2$ | 16 |
| Flying Capacitor | C3216X7R | 1 µF 100 V | 5.12 mm$^2$ | 6 |
| Isolation Capacitor | 3640HA | 2.7 nF 3 kV | 93 mm$^2$ | 2 |
| Resonant Inductor | T50-6 | 26 AWG, 38 turns, 5.7 pH | 127 mm$^2$ | 2 |
| Rectifier Diode | PD3S160-7 | 60 V 1 A | 0.81 mm$^2$ | 4 |

TABLE 2

Example Parts on 2:1 Step Down LED Driver

| Component | Part No. | Desc. | Size | Qty. |
|---|---|---|---|---|
| Switch | Siliconix Si5980DU | NMOS FET 100 V 0.5 ohm Qg = 3.3 nC, Cgs = 78 pF | 4.5 mm$^2$ | 6 |
| Flying Capacitor | TDK C3216X7R2A105K | 1 µF 100 V | 5.12 mm$^2$ | 4 |
| Isolation Capacitor | 3640HA | 2.7 nF 3 kV Ceramic, ESR <0.04 ohm | 93 mm$^2$ | 2 |
| Resonant Inductor | T50-6 | 26 AWG, 38 turns, 5.7 µH ESR <0.3 ohm | 127 mm$^2$ | 2 |
| Rectifier Diode (Schottky barrier) | PD3S160-7 | 60 V 1 A | 0.81 mm$^2$ | 4 |

What is claimed is:

1. A switched-capacitor voltage converter apparatus, comprising:
a current regulator having at least two H-bridge switch stages interconnected with capacitors, each said H-bridge stage configured for receiving an input voltage and generating a predetermined output current;

a multi-primary-winding transformer having a separate primary winding connecting across each H-bridge stage of said current regulator, and a secondary winding with an output configured for driving current through the load; and a current controlled oscillator which generates two phase outputs for driving states in said H-bridge switch stages;

wherein said current controlled oscillator is configured for sensing current delivered to a load and changing duty cycle and/or frequency of said current controlled oscillator to maintain a predetermined load current.

2. The apparatus recited in claim 1, wherein said apparatus is configured for connection to light emitting diodes (LEDs).

3. The apparatus recited in claim 2, wherein said apparatus is configured to drive multiple light emitting diodes (LEDs) in series.

4. The apparatus recited in claim 1, where said input voltage comprises a rectified line voltage.

5. The apparatus recited in claim 1, further comprising a tank circuit comprising at least one inductor and one capacitor on each of a first and second output of said current regulator.

6. The apparatus recited in claim 1, further comprising a multi-level rectifier network comprising banks of switched capacitors in an ascending bank configuration for correcting power factor of an input voltage prior to receipt by said current regulator.

7. The apparatus recited in claim 6, wherein said ascending bank configuration of said multi-level rectifier network comprises banks of switches with associated capacitor, with each successive bank containing two additional switches and one additional capacitor.

8. The apparatus recited in claim 6, wherein switches associated with said switched capacitors of said multi-level rectifier network are configured to be switched on and off in either a first group or a second group.

9. The apparatus recited in claim 6, wherein said multi-level rectifier network is configured for passing voltages in uniform steps between zero volts up to full received voltage.

10. The apparatus recited in claim 1, further comprising a boost inductor connected between said input voltage and a multi-level rectifier network to smooth current drawn from said input voltage.

11. A switched-capacitor voltage converter apparatus with power- factor correction, comprising:
a multi-level rectifier network receiving a line voltage;
a current regulator configured for driving an LED load of one or more light emitting diodes (LEDs) at a desired load current;
said multi-level rectifier network having banks of switched capacitors in an ascending bank configuration for correcting power factor of the line voltage being rectified prior to receipt by said current regulator;
said current regulator having at least two H-bridge switch stages interconnected with capacitors;
a current controlled oscillator which generates two phase outputs for driving states in said H-bridge switch stages of said current regulator, and said banks of switched capacitors in said multi-level rectifier network;
a resonant LC tank circuit coupled to said current regulator;
wherein said current controlled oscillator is configured for sensing current delivered to the LED load and changing duty cycle and/or frequency of said current controlled oscillator to maintain the desired load current through said resonant LC tank circuit to the LED load.

12. The apparatus recited in claim 11, wherein said LC tank circuit comprises at least one inductor and one capacitor on each of a first and second output of said current regulator.

13. The apparatus recited in claim 11, wherein said ascending bank configuration of said multi-level rectifier network comprises banks of switches with associated capacitor, with each successive bank containing two additional switches and one additional capacitor.

14. The apparatus recited in claim 13, wherein switches associated with said switched capacitors of said multi-level rectifier network are configured to be switched on and off in either a first group or a second group.

15. The apparatus recited in claim 11, wherein said multi-level rectifier network is configured for passing voltages in uniform steps to said current regulator, wherein said voltages are between zero volts up to full voltage received at said multi-level rectifier network.

16. A switched-capacitor voltage converter apparatus with power-factor correction, comprising:
a multi-level rectifier network receiving a line voltage;
a current regulator configured for driving an LED load of one or more light emitting diodes (LEDs) at a desired load current;
said multi-level rectifier network having banks of switched capacitors in an ascending bank configuration for correcting power factor of the line voltage being rectified prior to receipt by said current regulator;
said current regulator having at least two H-bridge switch stages interconnected with capacitors;
a current controlled oscillator which generates two phase outputs for driving switch states in said H-bridge switch stages of said current regulator, and said banks of switched capacitors in said multi-level rectifier network;
a multi-primary-winding transformer having a separate primary winding connecting across each H-bridge stage of said current regulator, and a secondary winding with an configured for driving current through the LED load;
wherein said current controlled oscillator is configured for sensing current delivered to the LED load and changing oscillator duty cycle and/or frequency to maintain the desired load current through said multi-primary winding transformer to the LED load.

17. The apparatus recited in claim 16, wherein said ascending bank configuration of said multi-level rectifier network comprises banks of switches with associated capacitor, with each successive bank containing two additional switches and one additional capacitor.

18. The apparatus recited in claim 16, wherein switches associated with said switched capacitors in said multi-level rectifier network are configured to be switched on and off in either a first group or a second group.

19. The apparatus recited in claim 16, wherein said multi-level rectifier network is configured for passing voltages in uniform steps to said current regulator, and wherein said voltages are between zero volts up to full voltage received at said multi-level rectifier network.

20. A switched-capacitor voltage converter apparatus, comprising:
a current regulator having at least two H-bridge switch stages interconnected with capacitors, each said H-bridge stage configured for receiving an input voltage and generating a predetermined output current;
a multi-level rectifier network comprising banks of switched capacitors in an ascending bank configuration for correcting power factor of an input voltage prior to receipt by said current regulator; and a current controlled oscillator which generates two phase outputs for driving states in said H-bridge switch stages;

wherein said current controlled oscillator is configured for sensing current delivered to a load and changing duty cycle and/or frequency of said current controlled oscillator to maintain a predetermined load current.

21. The apparatus recited in claim 20, wherein said apparatus is configured for connection to light emitting diodes (LEDs).

22. The apparatus recited in claim 21, wherein said apparatus is configured to drive multiple light emitting diodes (LEDs) in series.

23. The apparatus recited in claim 20, where said input voltage comprises a rectified line voltage.

24. The apparatus recited in claim 20, further comprising a tank circuit comprising at least one inductor and one capacitor on each of a first and second output of said current regulator.

25. The apparatus recited in claim 20, further comprising a multi-primary-winding transformer having a separate primary winding connecting across each H-bridge stage of said current regulator, and a secondary winding with an output configured for driving current through the load.

26. The apparatus recited in claim 20, wherein said ascending bank configuration of said multi-level rectifier network comprises banks of switches with associated capacitor, with each successive bank containing two additional switches and one additional capacitor.

27. The apparatus recited in claim 20, wherein switches associated with said switched capacitors of said multi-level rectifier network are configured to be switched on and off in either a first group or a second group.

28. The apparatus recited in claim 20, wherein said multi-level rectifier network is configured for passing voltages in uniform steps between zero volts up to full received voltage.

29. The apparatus recited in claim 20, further comprising a boost inductor connected between said input voltage and a multi-level rectifier network to smooth current drawn from said input voltage.

30. A switched-capacitor voltage converter apparatus, comprising:
a current regulator having at least two H-bridge switch stages interconnected with capacitors, each said H-bridge stage configured for receiving an input voltage and generating a predetermined output current;
a boost inductor connected between said input voltage and a multi-level rectifier network to smooth current drawn from said input voltage; and
a current controlled oscillator which generates two phase outputs for driving states in said H-bridge switch stages;

wherein said current controlled oscillator is configured for sensing current delivered to a load and changing duty cycle and/or frequency of said current controlled oscillator to maintain a predetermined load current.

31. The apparatus recited in claim 30, wherein said apparatus is configured for connection to light emitting diodes (LEDs).

32. The apparatus recited in claim 31, wherein said apparatus is configured to drive multiple light emitting diodes (LEDs) in series.

33. The apparatus recited in claim 30, where said input voltage comprises a rectified line voltage.

34. The apparatus recited in claim 30, further comprising a tank circuit comprising at least one inductor and one capacitor on each of a first and second output of said current regulator.

35. The apparatus recited in claim 30, further comprising a multi-primary-winding-transformer having a separate primary winding connecting across each H-bridge stage of said current regulator, and a secondary winding with an output configured for driving current through the load.

36. The apparatus recited in claim 30, further comprising a multi-level rectifier network comprising banks of switched capacitors in an ascending bank configuration for correcting power factor of an input voltage prior to receipt by said current regulator.

37. The apparatus recited in claim 36, wherein said ascending bank configuration of said multi-level rectifier network comprises banks of switches with associated capacitor, with each successive bank containing two additional switches and one additional capacitor.

38. The apparatus recited in claim 36, wherein switches associated with said switched capacitors of said multi-level rectifier network are configured to be switched on and off in either a first group or a second group.

39. The apparatus recited in claim 36, wherein said multi-level rectifier network is configured for passing voltages in uniform steps between zero volts up to full received voltage.

* * * * *